(12) United States Patent
Fambon et al.

(10) Patent No.: US 8,606,914 B2
(45) Date of Patent: Dec. 10, 2013

(54) NETWORK COMMUNICATION METHOD WITH A SMARTCARD USING ASYNCHRONOUS MESSAGES

(75) Inventors: Olivier Fambon, Grenoble (FR); André Freyssinet, Saint Paul de Varces (FR); Philippe Laumay, Crolles (FR)

(73) Assignee: Gemalto SA, Meudon (FR)

( * ) Notice: Subject to any disclaimer, the term of this patent is extended or adjusted under 35 U.S.C. 154(b) by 3152 days.

(21) Appl. No.: 10/505,931

(22) PCT Filed: Feb. 26, 2003

(86) PCT No.: PCT/IB03/00770
§ 371 (c)(1),
(2), (4) Date: Aug. 27, 2004

(87) PCT Pub. No.: WO03/073727
PCT Pub. Date: Sep. 4, 2003

(65) Prior Publication Data
US 2005/0125502 A1 Jun. 9, 2005

(30) Foreign Application Priority Data
Feb. 28, 2002 (FR) .................................. 02 02567

(51) Int. Cl.
*G06F 15/173* (2006.01)
*G06F 13/00* (2006.01)
(52) U.S. Cl.
USPC ........................... 709/225; 709/223; 710/104
(58) Field of Classification Search
USPC ........................... 709/223–225; 370/241, 252
See application file for complete search history.

(56) References Cited

U.S. PATENT DOCUMENTS

| 5,761,309 | A | * | 6/1998 | Ohashi et al. ................ 713/156 |
| 5,790,885 | A | * | 8/1998 | Shona ............................... 710/5 |
| 6,192,436 | B1 | * | 2/2001 | Jacobson et al. .............. 710/104 |
| 6,195,700 | B1 | * | 2/2001 | Bender et al. ................. 709/230 |
| 6,535,997 | B1 | * | 3/2003 | Janson et al. .................... 714/15 |
| 6,715,082 | B1 | * | 3/2004 | Chang et al. ...................... 726/8 |

(Continued)

OTHER PUBLICATIONS

Shrivastava, S. K., et al: "A workflow and agent based platform for service provisioning" EDOC Conference, 2000. Proceedings. Fourth Internal Mukuhari, Japan Sep. 25-28, 2000, Los Alamitos, CA, USA, IEEE Comput. Soc, US, Sep. 25, 2000, pp. 38-47, XP010521574 ISBN: 0-7695-0865-0.

(Continued)

*Primary Examiner* — Rupal Dharia
*Assistant Examiner* — Joe Chacko
(74) *Attorney, Agent, or Firm* — The Jansson Firm; Pehr B. Jansson

(57) ABSTRACT

This invention concerns a computer communication method using asynchronous messages in a distributed software architecture, for example of type AAA-MOM (Agent Anytime Anywhere - Messages Oriented Middleware), including a disconnectable platform such as a smartcard. This communication is carried out between firstly a card agent (CA), stored in a removable platform (31, 32), connectable to a terminal (21, 22), and secondly at least one standard software agent (AS). This standard agent can be stored in this computer network (1), in another renmovable platform. A message sent by the card agent (CA) to a standard agent (AS) or sent by a standard agent AS) to the card agent (CA), is stored in the network by at least one intermediate agent (CEPA,CAPA) managing the communications of this card agent (CA) with network (1).

33 Claims, 4 Drawing Sheets

(56) References Cited

U.S. PATENT DOCUMENTS

2001/0000814 A1* 5/2001 Montgomery et al. ......... 710/10
2002/0035651 A1* 3/2002 Langton ............................ 710/5
2003/0150915 A1* 8/2003 Reece ........................... 235/449

OTHER PUBLICATIONS

PCT/IB2003/00770 International Search Report, Jul. 17, 2003, European Patent Office, P.B. 5818 Patentlaan 2 NL—2280 HV Rijswijk.

* cited by examiner

NETWORK COMMUNICATION METHOD WITH A SMARTCARD USING ASYNCHRONOUS MESSAGES

BACKGROUND OF THE INVENTION

1. Field of the Invention

This invention concerns a computer communication method using asynchronous messages in distributed software architecture, for example of type AAA-MOM (Agent Anytime Anywhere—Message Oriented Middleware), including a disconnectable platform such as a smartcard.

2. Description of the Related Art and Summary of the Invention

The applications or information systems which may need to use one or more computer networks of digital data processing stations represent a major part of the current and future computer developments. These systems may play an important role in applications such as the management of data shared by several people or groups of people. In addition, such applications may need to manage data, stored in platforms located in different places and which may vary depending on the times.

The development of such applications using networks is more and more frequently based on software or computer programs using distributed architecture, i.e. where various software components are run on different data processing stations or platforms. These components may also be located on different platforms depending on the times. Such data processing stations are connected by a combination of computer communication networks whose hardware and software architectures may be heterogeneous, each forming a node of a network which may take numerous forms and cover more or less extensive areas, for example from the simple local configuration with a few stations up to a global network such as the Internet.

In the remainder of this description, the term "node" refers to the various stations or hardware platforms of such a network and the term "network" to the set of these nodes and the physical and software architectures providing communication between them.

A distributed architecture application may therefore include a set of agents (reactive software components) operating together and interacting. These agents may exist on one or more different nodes of the network at the same time, or even use different nodes at different times. This type of application offers various advantages, for example not depend on a single node whether regarding its existence or its performance.

To develop and produce this type of distributed application, the communication between the various agents may be managed at each node by a software layer, called middleware, in between the operating system of the platform forming the node and the applications or agents operating on this platform. Amongst the various types of middleware, there is a software infrastructure commonly called MOM (Message Oriented Middleware), which uses asynchronous messages as the basis of all the communication, coordination and synchronisation structures of its various components or agents. These messages are qualified as asynchronous since they can be sent and received regardless of the availability of their respective recipient and sender. Generally, such messages contain, in addition to the information to be transmitted, one or more codes identifying the message sender and recipient, and possibly additional information or markers used and modifiable by the various agents involved in their transmission.

The advantage with this type of communication infrastructure is that it provides, in many high-level programming languages, especially object-oriented languages such as Java®, reliable and user-friendly tools for communication between the agents. Use of the tools supplied in this type of software infrastructure is in fact independent of the actual communication modes implemented in the network.

One of the MOMs is the architecture known as AAA or A3 (Agent Anytime Anywhere), used for example by the NET-WALL® software, described in particular in the paper with the following reference:

"An Agent Platform for Reliable Asynchronous Distributed Programming",

L. Bellissard, N. De Palma, A. Freyssinet, M. Herrmann, S. Lacourte, Symposium on Reliable Distributed Systems (SRDS'99) (short paper), Lausanne—Switzerland, 20-22 Oct. 1999

This AAA architecture is based on a MOM type communication software infrastructure, which manages these asynchronous messages and includes for example "Agents" and "Agent Servers". An agent can be defined as a unitary reactive software component, which reacts according to specific events. An agent server includes a software program running on a platform and managing a certain number of agents, which may include an engine that executes the software operations forming the reactions of the agent it manages.

Whenever at least one application executed in this architecture needs to operate for a given period, or even permanently, the AAA architecture itself and a certain number of its AAA agents must operate and be accessible during at least this period, which will be defined by the fact that an agent is "persistent".

Consequently, any failure in part of the network or its nodes could result in the disappearance or unavailability for the rest of the network of an agent on this part of the network, or of messages transiting in this part of the network between several agents, and result in malfunctions in the applications using this architecture.

To ensure that this type of architecture operates correctly, the network and its nodes include various mechanisms and methods, automatic or not, used to restore the integrity of any software element in the AAA architecture which should be damaged or lost.

With the development of embedded computing and the multiplication of portable objects capable of data processing, such as integrated circuit cards or smartcards, such objects are now frequently connected as nodes in a network supporting one or more, simple or distributed, applications.

Typically, this type of object can be repeatedly disconnected from the network at any time, remain disconnected from the network a certain amount of time, then possibly be reconnected at another unpredictable place on the network. With the current technology, such unpredictable absence of certain components of AAA architecture is not managed by the various mechanisms and communication protocols operating such a network.

In order to use the development facilities provided by AAA architecture for distributed applications including the use of such portable objects, especially the transparency of the communication modes with respect to high level languages, it would be useful to have, for the features of this architecture, an implementation suitable for such objects and therefore managing such specificities.

One objective of the invention is to provide a method allowing the transmission of any asynchronous message between an agent stored in a portable and disconnectable object and another agent stored in the network, transparently for the network.

This objective is reached using a computer communication method by asynchronous messages between firstly at least any one software agent, known as the card agent, stored in a portable data processing station, known as removable platform, which can be connected or disconnected by communication means with at least a data processing station, known as terminal, at any time and independently of the operating status of this terminal or the removable platform, and secondly at least any one software agent, known as standard agent, this standard agent being either stored in storage means of a computer network connected to this terminal and including one or more data processing stations storing one or more software agents communicating together via a distributed software infrastructure for computer communication by asynchronous messages, either stored in this removable platform or in another similar platform, characterised in that it comprises a step to store a message sent by the card agent to at least a standard agent or sent by a standard agent to the card agent, in storage means of the network, by at least an intermediate agent managing the communications of this card agent with the network.

According to one characteristic, the method comprises the following steps:
- transmission to the network by this card agent of a message or message indicator intended for a standard agent;
- transmission of a message or message indicator intended for this standard agent, from this card agent to an agent known as card engine proxy agent, stored in storage means of the network;
- storage of said message or message indicator in storage means of the network by the card engine proxy agent;
- transmission via the network of said message or message indicator by the card engine proxy agent;

According to one characteristic, the method comprises the following steps:
- reception via the network of a message or message indicator intended for this card agent, by an agent known as card engine proxy agent, stored in storage means of the network;
- storage in storage means of the network of said message or message indicator by the card engine proxy agent;
- transmission of said message or message indicator by the card engine proxy agent to at least one card agent stored in the removable platform;
- storage of said message or message indicator in storage means of the removable platform;

According to one characteristic, the messages transmitted between the card agent and the card engine proxy agent, or vice versa, transit via a card engine agent, stored in storage means of the removable platform, designed to manage or control this card agent.

According to one characteristic, the method also comprises the following steps:
- storage of said message or message indicator in storage means of the network by a card agent proxy agent, stored in the network and indicating the identity of the recipient card agent;
- transmission of a message or message indicator intended for the card agent from the card agent proxy to the card engine proxy agent corresponding to the recipient card agent According to one characteristic, the message exchanges between the card engine proxy agent and the card engine agent are carried out according to a "first in first out" type scheduling system.

According to one characteristic, the message exchanges between the card engine proxy agent and the card engine agent use at least one transmission method with acknowledgement of receipt so that the sender of a message or message indicator can obtain confirmation, by the recipient of this same message, of its correct reception and so that the messages not received by the recipient can be transmitted again.

According to one characteristic, the card engine agent or the card engine proxy agent sends one or more messages or message indicators to a given recipient agent implementing a method known as acknowledgement of receipt buffer method, comprising the following steps:
- storage in an acknowledgement of receipt buffer, by the sender of one or more messages or message indicators to be sent, these messages or indicators being sorted in the order in which they must be sent and associated with "index" identifiers;
- transmission, from the sender to the recipient, of at least one message or message indicator together with "marking" data representing the index of this message;

According to one characteristic, said acknowledgement of receipt buffer method also comprises the following steps:
- reception by the recipient, of at least one message or message indicator together with "marking" data representing the index of this message;
- transmission from the recipient to the sender of "index" data of the last message received by the recipient including or representing the value of the index represented by the marking which accompanied the last message or indicator received from this sender;
- reception of this index of the last message received by the sender and comparison of this index with the indices of the messages or indicators stored in its acknowledgement of receipt buffer;
- further transmission, by the sender to the recipient, of messages or indicators stored after the message whose index corresponds to the index of the last message received by the recipient in its acknowledgement of receipt buffer, According to one characteristic, a further transmission, by said acknowledgement of receipt buffer method, of the messages stored by the sender in its acknowledgement of receipt buffer and not yet received by the recipient, is carried out in the order that these messages were stored in this acknowledgement of receipt buffer.

According to one characteristic, said acknowledgement of receipt buffer method also comprises a step in which the recipient stores, as index of the last message received by the network or index of the last message received by the card, data including or representing the index of the location where this message is stored in the sender's acknowledgement of receipt buffer.

According to one characteristic, the acknowledgement of receipt buffer method also comprises at least one step in which the recipient of the message or indicator checks the integrity of the content of this message or indicator, the index of the last message received by the recipient then being determined as being the index represented by the marking accompanying the last message received whose integrity meets specific conditions.

According to one characteristic, the card engine proxy agent sends to the card engine agent one or more messages or indicators received from the network, implementing a method known as buffer flow control method, comprising the following steps:

- storage in a flow control buffer located in storage means of the network of one or more messages or indicators received, these messages or indicators being sorted according to their order of reception;
- verification of the acknowledgement of receipt buffer operation;
- transmission of said messages or indicators, in the order that they were received, according to said acknowledgement of receipt buffer method.

One objective of the invention is to propose a method to update the agents stored in a portable and disconnectable object, regarding the messages exchanged with another agent stored in the network, following a period during which this object is disconnected, to provide continuous operation of the applications using this object.

This objective is reached by a method as described above, characterised in that the communication means of the terminal are managed by at least one terminal communication agent stored in storage means of the terminal or the network, transition of the removable platform status from connected to disconnected triggering the following steps:

- detection by the terminal communication agent of disconnection of the removable platform;
- transmission of a disconnection notification message from the terminal communication agent to the card engine proxy agent;
- storage in the storage means of the network by the card engine proxy agent of the removable platform disconnected status.

According to one characteristic, said buffer flow control method also includes a step in which the card engine proxy agent obtains the connection or accessibility status of the removable platform from the network.

According to one characteristic, communication of the terminal with the removable platform is managed by at least one terminal communication agent stored in storage means of the terminal or the network, transition of this removable platform status from disconnected to connected, combined or not with another event, triggering the following steps:

- detection of this connection by the terminal communication agent;
- obtention by the terminal communication agent of data representing a code identifying a card agent or a card engine agent, stored in the storage means of the removable platform;
- transmission of an insertion notification message, from the terminal communication agent to the card engine proxy agent, including or representing the code of the card engine agent or the card agent.

According to one characteristic, a card engine proxy agent stored in the network and a card engine agent stored in the removable platform exchange one or more messages or message indicators according to said acknowledgement of receipt buffer method, transition of the removable platform status from disconnected to connected, combined or not with another event, triggering an update method including the following steps:

- transmission, from the terminal communication agent or the card engine agent to the card engine proxy agent of the index of the last message received by the card stored by this card engine agent;
- transmission, from the card engine proxy agent to the card engine agent of messages or indicators stored in its acknowledgement of receipt buffer as being intended for this card engine agent, and not yet received by it.

According to one characteristic, a card engine proxy agent stored in the network and a card engine agent stored in the removable platform exchange one or more messages or message indicators according to said acknowledgement of receipt buffer method, transition of the removable platform status from disconnected to connected, combined or not with another event, triggering an update method including the following steps:

- transmission, from the card engine proxy agent to the card engine agent of the transmission index of the last message received by the network stored by this card engine proxy agent;
- transmission, from the card engine agent to the card engine proxy agent of messages or indicators stored in its acknowledgement of receipt buffer as being intended for this card engine proxy agent, and not yet received by it.

According to one characteristic, the method comprises:

- a serialisation step comprising a conversion of software objects to be sent by agent from a communication terminal to a removable platform or vice versa, this conversion being carried out from the structured form of these software objects in the agent which wants to send them, to the less structured data form in which they can be sent between a communication terminal and the communication means of a removable platform or vice versa.
- a deserialisation step performing the reverse conversion once this transmission has been carried out.

According to one characteristic, at least one card engine proxy agent manages the communications with the network of several card engine agents, this card engine proxy agent storing, in the network, data representing an identification code, a platform accessibility or inaccessibility status, an index of the last message received by the network, and the content of the messages sent without acknowledgement of receipt, for each of the card engine agents that it manages.

According to one characteristic, at least one agent communicates via the network using an AAA or compatible software communication infrastructure.

According to one characteristic, at least one of said agents participates in at least one application programmed in language Java®.

One objective of the invention is to provide a system allowing the communication by asynchronous messages between an agent stored in a portable and disconnectable object and another agent stored in the network, transparently for the network.

This objective is reached by a communication system by asynchronous messages between firstly a computer network comprising one or more data processing stations storing one or more software agents communicating together via a distributed software infrastructure for computer communication by asynchronous messages, and secondly at least one portable object comprising at least one processor, storage means and means of communication with at least one terminal connected to the network, characterised in that this portable object comprises at least one software agent, known as card agent, communicating by message or message indicator with at least any one software agent, known as standard agent, this standard agent being either stored in storage means of a computer network or stored in this removable platform or in another similar platform, this computer network, this communication being carried out via at least one intermediate agent stored in the storage means of the network and managing the communications of the card agent with the network.

One objective of the invention is to propose a system to update the agents stored in a portable and disconnectable object, regarding the messages exchanged with another agent stored in the network, following a period during which this object is disconnected, to provide continuous operation of the applications using this object.

According to one characteristic, the system comprises at least one software agent, known as terminal communication agent, stored in the storage means of the terminal or the network, designed to manage the communication between the terminal and the removable platform, this terminal communication agent and to send the connection or disconnection notifications of the removable platform.

According to one characteristic, the removable platform comprises at least one software agent, known as card engine agent, designed to manage or control the operation of at least one card agent, the card engine proxy agent then managing the communications of this card engine agent with the network.

According to one characteristic, the system comprises at least one software agent, known as card agent proxy agent, stored in the storage means of the network, designed to indicate the identity of at least one card agent and receive from the network the messages addressed to it.

According to one characteristic, the network, or the removable platform, or both, comprise a memory structure, known as acknowledgement of receipt buffer, designed to index and store the messages sent from the network to the removable platform or vice versa, and send them again to their recipients when they were not correctly received.

According to one characteristic, the network comprises a memory structure, known as flow control buffer, designed to store the messages received by the card engine proxy agent for a card agent, then to present these messages to the acknowledgement of receipt buffer for transmission to the removable platform when the removable platform is accessible or when the acknowledgement of receipt buffer is not full.

According to one characteristic, the acknowledgement of receipt buffer and the control buffer extract the messages they store in the order that they were stored.

According to one characteristic, the card engine proxy agent and the card engine agent include a serialisation function and a deserialisation function, carrying out in one direction and respectively in the opposite direction, the conversion or translation of at least one message to be transmitted via the terminal between the structure they present when they are received and a structure compatible with the terminal and the communication means of the removable platform.

According to one characteristic, the communication between the terminal and the communication means of the removable platform is carried out by transmission of data in APDU format according to standard ISO 7816.

According to one characteristic, at least two stations forming the network communicate together using a software infrastructure of type AAA-MOM.

According to one characteristic, the system includes at least one of said agents programmed in the language Java®.

BRIEF DESCRIPTION OF THE DRAWINGS

The features and advantages of this invention will appear more clearly on reading the description referring to the drawings attached on which.

DESCRIPTION OF THE INVENTION

Figure 1:
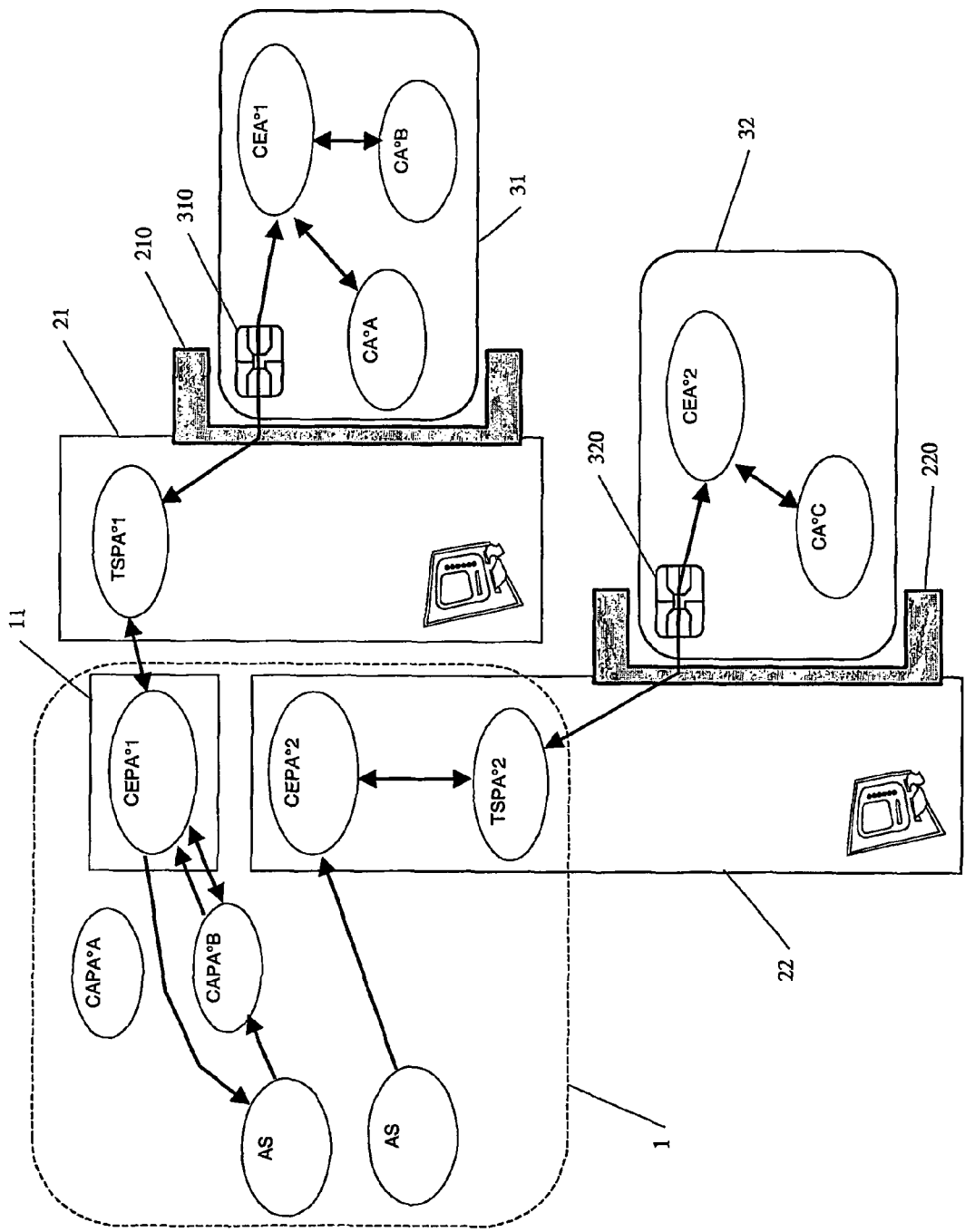
FIG. 1 represents several variants of the method according to the invention, in a symbolic diagram of a network communicating with the removable platform using this method.

In this description an agent, or software agent, is defined as a reactive component of a computer program with an identity, for example through the use of a code identifying it locally or globally with respect to other software components. An agent is stored in storage means and may exist as a process, executed or waiting to be executed, by a processor. Reactive means the ability to perform an action, internal or interacting with other elements, when certain events occur.

According to the applications and the modes of realisation, an agent can exist on its own or be controlled and managed by another agent, sometimes qualified as engine.

According to the applications and modes of realisation, the messages exchanged may be complete or partial messages, containing all or some of the information to be transmitted. Without leaving the scope of the invention, the features and characteristics described for messages also apply to simple message indicators indicating the existence of a message to the recipient of this message and possibly information enabling it to locate and read this message.

For some programming environments, such as Java®, or for some software infrastructures in a network of data processing stations, such as the "AAA" or "A3" type infrastructure, a software agent could be qualified as "Java agent" or "AAA" agent if it corresponds to the respective criteria of these environments or software infrastructures.

The operation of the method according to the invention includes the use of agents, some including the term "proxy" in the name used to designate them. A "proxy" server is defined in some dictionaries as being a "substitute computer performing an operation on behalf of a requester" for example when the requester cannot do it itself or to avoid compromising its security. The term "proxy" used in this description may refer to this aspect of delegation or substitute function, but must above all be understood through the description given for each element so designated.

This type of network may include one or more interconnected subnetworks, for example Local Area Networks (LAN) within one or more buildings, Medium Area Networks (MAN) within an area such as a town, Wide Area Networks (WAN) including a certain number of stations distributed over large distances, or a global network such as the Internet. This type of network may use one or more physical architectures, for example star or mesh architecture, and use different or even variable standards or protocols for each operating layer providing the communication between its various nodes and their respective systems.

Since the software communication architecture used makes the communications transparent for the various agents respecting this infrastructure, this network can be considered as being a single network including all nodes forming it, where the hardware distribution of the various storage means and the various agents interacting together has no importance from the point of view of the agents themselves.

This description applies to the case of a network operating with an architecture based on an AAA-MOM communication infrastructure, and more especially for agents and applications programmed in the language Java®, but it must be clear that the same characteristics can be used with other architectures or other languages, or both, without leaving the scope of the invention.

This description illustrates a method and a system according to the invention in one of its modes of realisation. Obviously, when one or more steps or features are described possibly including variants, it must be understood that a method or system combining one or more of these variants also represents a mode of realisation of the invention.

FIG. 1 is a symbolic diagram of some of the communications between the various agents involved in transmitting a message, in either direction, between an AAA type software agent, known as card agent (CA°A, CA°B, CA°C), stored in a removable platform, for example a smartcard (31, 32) and another AAA type software agent, known as standard agent (AS). A standard agent (AS) is then an AAA type agent, stored in any location of a network (1), which includes a network of stations or nodes communicating together using an AAA-MOM type infrastructure.

A data processing station known as removable platform (31, 32), consists for example of a smartcard comprising at least one processor, storage means and communication means (310, 320).

According to a variant, the removable platform (31) is connected to the network (1) by a first terminal (21), connected to a node (11) of the network (1) by communication means of known type and having a connection location (210). This connection location ensures the communication between the terminal (21) and the removable platform (31) by connection means, for example using electrical contact or radio communication, or both, according to a communication protocol of known type, for example APDU type complying with standard ISO 7816. This terminal (21) comprises a data processing station storing at least one terminal communication agent (TSPA°1) which manages by known means the communication between the communication means (310) of the removable platform (31) and the terminal itself.

According to another variant, the removable platform (32) is connected to the network (1) via a second terminal (22), which also has a connection location (220). The communication of the second terminal (22) with the removable platform (32) is managed according to known means by a terminal communication agent (TSPA°2), which is an AAA type agent stored in storage means of the network (1), for example in this communication terminal (22). Since this terminal communication agent (TSPA°2) is itself an AAA agent, it can itself be considered as part of the network (1).

Within an application programmed in a high level language, and especially with object oriented or structured languages such as, for example, Java®, much of the data used or processed is organised and stored as software objects of precise structure, more complex than a simple series of bytes. Such objects may include several variables or data groups, for example as character strings, one or two dimensional arrays, records composed of several fields, or objects types (sometimes called super-types) defined by the language or the programmer as a combination of several other objects of various types. Such structured objects may sometimes be defined or represented by tree structures including various objects themselves of different types, the organisation of such a structure sometimes being called the object graph.

So that AAA agents can transmit such structured software objects from the network (1) to the removable platform and vice versa, the method according to the invention comprises conversion or serialisation steps. A serialisation step consists of converting a structure software object into a linear series of data compatible with the APDU communication format used by the communication means (310, 320) or by the terminal (21, 22). After transmission of this data in APDU format. Another step, known as deserialisation, consists of performing the reverse conversion in order to supply the recipient agent with a software object which has its initial structure.

Within the removable platform (31, 32), the card agents (CA°A, CA°B, respectively CA°C) are managed and controlled by at least one AAA agent, known as card engine agent (CEA°1, respectively CEA°2), itself stored and executed in the same removable platform (31, respectively 32).

To guarantee the permanent presence in the network (1) of such a card engine agent (CEA°1, respectively CEA°2), the method according to the invention uses at least one AAA agent, known as card engine proxy agent (CEPA°1, respectively CEPA°2), stored in at least one node (11) of the network (1). This card engine proxy agent (CEPA) acts as intermediate between its corresponding card engine agent and the rest of the network when the removable platform is accessible, and ensures continuity of accessibility of this card engine agent when the removable platform cannot be accessed. When the platform is disconnected, this continuity includes storage of all messages intended for the agent no longer accessible. When the platform status changes from disconnected to connected, this continuity then includes an exchange of information between this card engine agent (CEA°1, CEA°2) and its corresponding card engine proxy agent (CEPA°1, respectively CEPA°2) enabling each to send to the other the messages stored which could not be sent beforehand.

When a removable platform (31) is connected to the network (1) via a communication terminal (21), a message transmitted by a card agent (CA°A) to any AAA agent, known as standard agent (AS), of the network (1) is sent to the corresponding terminal communication agent (TSPA°1). This terminal communication agent (TMPA°1) then transmits this message to the corresponding card engine proxy agent (CEPA°1), which transmits it via the network (1) to its recipient.

In one mode of realisation, this card engine proxy agent (CEPA°1) then exchanges information with an AAA agent, known as card agent proxy agent (CAPA°A), stored in storage means of the network (1), so that the status of this card agent proxy agent (CAPA°A) indicates the status of the card agent (CA°A) which transmitted the message in question.

To guarantee continuity of presence with respect to the network (1) of the various card agents (CA°A, CA°B), the method according to the invention uses at least one agent, for example AAA type, known as card agent proxy agent (respectively CAPA°A, CAPA°B), stored in at least one node (11) of the network (1). This card agent proxy agent (CAPA°A, CAPA°B) indicates the existence of its corresponding card agent, for example by storing a code identifying this card agent (CAPA°A, CAPA°B).

When a removable platform (31) is connected to the network (1) via a communication terminal (21), in one mode of realisation, a message transmitted by a standard agent (AS) of the network (1) to a card agent (CA°B) is received by the card agent proxy agent (CAPA°B) corresponding to the recipient. This card agent proxy agent (CAPA°B) transmits this message to the corresponding card engine proxy agent (CEPA°1).

This card engine proxy agent (CEPA°1), serialises this message then transmits it to the terminal communication agent (TSPA°1). This message is then transmitted from the terminal communication agent (TSPA°1) to the corresponding card engine agent (CEA°1), which transmits it to the recipient card agent (CA°B).

According to a variant, the card engine proxy agent (CEPA°C) stores a code identifying one or more card agents (CA°C) present on the corresponding removable platform (32). A message transmitted by any AAA agent in the network (1) to a card agent (CA°C) is then received directly by the corresponding card engine proxy agent (CEPA°2). This message is then transmitted to the terminal communication agent (TSPA°2) which transmits it to the corresponding card engine agent (CEA°2), which transmits it to the recipient card agent (CA°C) similarly.

Note that this variant is independent of that concerning the type of terminal agent (TASP°1, TSPA°2). These two variants can be combined or not as required in a mode of realisation without leaving the scope of the invention.

Note that the recipient agent of the message transmitted by a card agent (CA°A) may also be another card agent (CA°B) located on the same removable platform (31) or another card agent (CA°C) located on another removable platform (32). The message will then be transmitted in the same way from the sender (CA°A) to the corresponding card engine proxy agent (CEPA°1) which will transmit it to the network. The message will then be received by the corresponding card agent proxy agent (CAPA°B) or directly by the corresponding card engine proxy agent (CEPA°2), then transmitted in the same way as previously described to the recipient card agent (CA°B, respectively CA°C). It must be clearly understood that the variants described for message reception do not depend on whether or not the message recipient is stored on the same removable platform as the transmitting agent.

In an exchange of asynchronous messages where the communications take unknown or variable paths, or both, various chance events are likely to delay the transmission of a message to its recipient, to a greater or lesser extent from one message to another. When transmitting two successive messages to the same recipient, the second message could even reach the recipient before the first. A software communication infrastructure, especially of type AAA-MOM, may therefore use means or methods designed to ensure that each recipient receives the messages in the correct order, also known as the causality order, or restore this order when processing them.

So that it is transparent with respect to the network (1) and does not disrupt this order of causality, the method according to the invention transmits the messages according to a first in first out (FIFO) protocol between the card engine agent (CEA°1, CEA°2) and its corresponding card engine proxy agent (CEPA°1, CEPA°2), and vice versa. In other words, each transmits to the other the messages received addressed to it in the order they were received.

Figure 2:
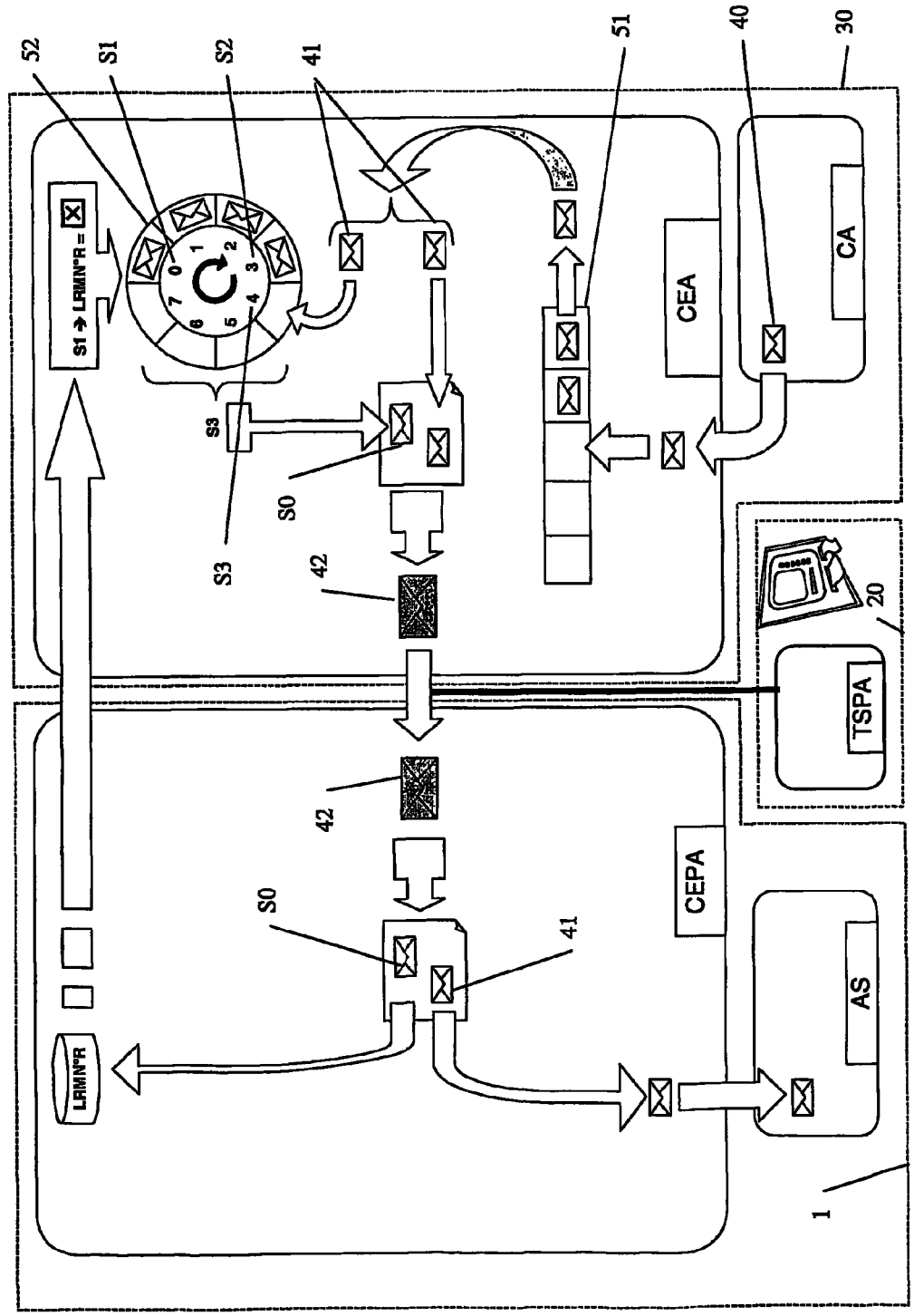
FIG. 2 represents a symbolic diagram describing the operation of an acknowledgement of receipt buffer method according to the invention in one mode of realisation, in the case of a message sent by a card agent to a standard agent of the network.

FIG. 2 represents a symbolic diagram of the circuit taken by a message transmitted from a card agent to a standard agent.

In the mode of realisation represented on FIG. 2, a card agent (CA) stored in a removable platform (30) transmits a message (40) to a standard agent (AS) stored in the network (1). This message is received by a card engine agent (CEA) also located in the removable platform (30), which stores it, for example, in a FIFO (first in first out) type data structure known as output queue (51), after the messages it already contains. The messages stored in this output queue (51) are then processed by the card agent in the order they arrived.

When a message (41) is extracted from the output queue (51) to be processed by the card agent, this message is stored in an acknowledgement of receipt buffer (52), for example circular type buffer as described below, and also prepared for transmission to a card engine proxy agent (CEPA) stored in the network (1).

The acknowledgement of receipt buffer (52) includes a specific number of locations sorted in a specific order, designed to store each a message. These locations or the messages they contain are numbered, or indexed, and this buffer (52) also permanently stores a number (S1, example=0), known as first message stored index, and a number (S2, example=3), known as last message stored index. When a new message (41) arrives in the acknowledgement of receipt buffer, it is stored in the location after the last message stored index (S2), and the value stored for the last message stored index (S2) is updated with the value (S3, example=4) of the index indicating the location where this new message (41) has been stored in this acknowledgement of receipt buffer (52).

At the same time, the card engine agent (CEA) adds to the message accompanying or marking data (S0), which will accompany it during its transmission to the card engine proxy agent (CEPA), this marking taking the new value of the last message stored index (S3, example=4).

In one mode of realisation, the message (41) to be transmitted and its marking (S0) are then serialised, i.e. converted into data (42) whose form is compatible with the operation of the communication means of the removable platform, for example in the form of characters or integers which can be transmitted as parameters of an ADPU protocol command according to standard ISO1876.

The data (42) representing the message (41) and its marking (S0) are then transmitted from the removable platform to the card engine proxy agent (CEPA) corresponding to the card engine agent (CEA), via a terminal communication agent (TSPA) managing the connection terminal (20) connected to the network (1), which has a connection location receiving said removable platform (30).

In one mode of realisation, when it is received by the card engine proxy agent (CEPA), the data (42) representing the message (41) and its marking (S0) is deserialised, i.e. converted in the direction opposite to serialisation in order to reproduce the original structure of the message (41) and its marking (S0) in its initial structured form, therefore compatible with the network agents.

In one mode of realisation, the card engine proxy agent (CEPA) will then transmit the message received (41) to the network (1) for the recipient standard agent (AS), and also read the
    marking (S0) accompanying this message then store its value as index of the last message received by the network (LRMN°R) and corresponding to this agent (CEPA).

At a given time, for example periodically or triggered by an event, the card engine proxy agent (CEPA) sends to the card engine agent (CEA) the value of the index of the last message received by the network (LRMN°R) as it was stored. When it receives this index of the last message received by the network (LRMN°R), the card engine agent (CEA) compares this index (LRMN°R) and the last message stored index (S2) and also the first message stored index (S1) corresponding to its acknowledgement of receipt buffer (52).

After this comparison, this card engine agent (CEA) then clears from its circular acknowledgement of receipt buffer (52) the messages transmitted between the first message stored, including this message, whose index (S1) is stored, and the message transmitted with an index corresponding to the index of the last message received by the network (LRMN°R), including this message. In addition, this agent (CEA) will read the messages in this buffer (52) then again transmit to the card engine proxy agent (CEPA) the messages it has not yet received. In other words, the messages stored between the index of the last message received by the network (LRMN°R), excluding this message, and the last message stored index (82), including this message. This further transmission is carried out using the same acknowledgement of receipt buffer method and in the order that they were stored, i.e. in the same order as their initial transmission by the card engine agent (CEA).

In a variant of this mode of realisation, the method according to the invention includes an integrity check on the transmitted data using known means. Each message (41) received by the card engine proxy agent (CEPA) is only considered as received if the integrity of its content and possibly that of its marking (S0), is complete or meets specific conditions.

It is clear that using this acknowledgement of receipt buffer method, all messages which have not been correctly received by the card engine proxy agent (CEPA) will be systematically resent by the card engine agent (CEA) until correctly received in the network (1) by the card engine proxy agent (CEPA), respecting the order in which they were received from the transmitting card agent (CA).

Figure 3:
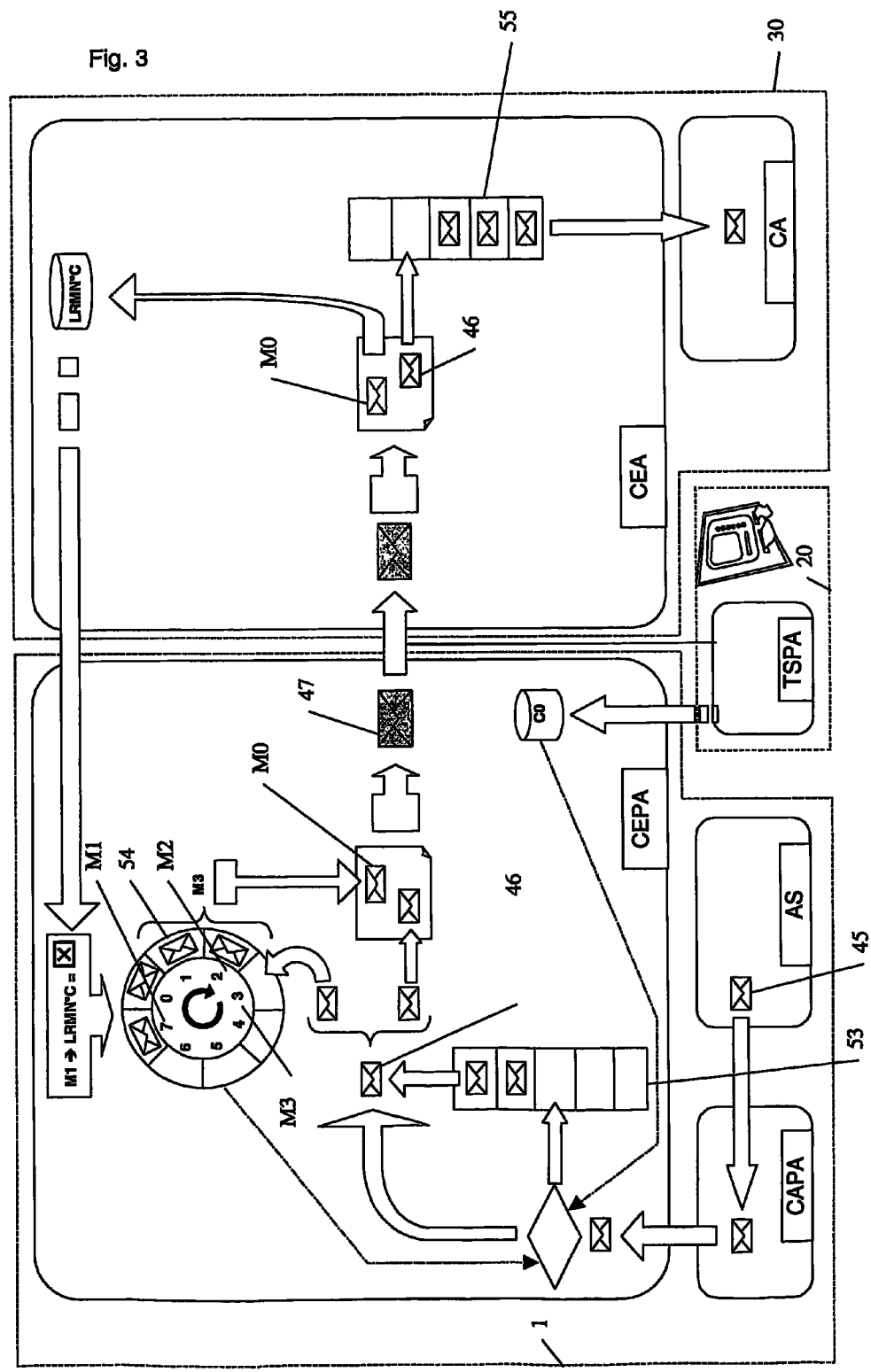
FIG. 3 represents a symbolic diagram describing the operation of a buffer flow control method according to the invention in one mode of realisation, in the case of a message received by a card agent from a standard agent of the network.

In one mode of realisation represented on FIG. 3, a standard agent (AS) present on the network (1) transmits via this network a message (45) intended for a card agent (CA) stored in a removable platform (30) and itself managed by a card engine agent (CEA) stored in this removable platform. This message is received by a card agent proxy agent (CAPA) indicating the identity of the recipient card agent (CA). This message is then transmitted by the card agent proxy agent (CAPA) via the network (1) to a card engine proxy agent (CEPA) corresponding to the card engine agent (CEA) and including an acknowledgement of receipt buffer (54) and a flow control buffer (53), for example a FIFO type input queue.

Whenever the removable platform containing the card engine agent (CEA) corresponding to the card engine proxy agent (CEPA) is connected or respectively disconnected, the card engine proxy agent (CEPA) receives an insertion or respectively disconnection notification from a terminal communication agent (TSPA) managing the terminal (20) where this removable platform (30) is connected. This card engine proxy agent (CEPA) then stores the accessibility status of this removable platform in storage means of the network, for example as card status data (C0) indicating the accessibility status.

On reception of this message (45), the card engine proxy agent (CEPA) makes a comparison to find out whether the removable platform (30) containing the recipient card agent (CA) is accessible and also to check whether or not the acknowledgement of receipt buffer (54) is full.

If the card engine proxy agent (CEPA) detects that the removable platform is not accessible or if the acknowledgement of receipt buffer (54) has no free locations, the message is stored in the flow control buffer (53) after the messages it already contains.

When the acknowledgement of receipt buffer has free locations again, and possibly on condition that the platform is accessible, the oldest message (46) stored in the input queue (53) is read, stored in an acknowledgement of receipt buffer (54) and associated with marking (M0) corresponding to its index (M3), then transmitted to the card engine agent (CEA) according to the acknowledgement of receipt buffer method described above (see FIG. 2). In one mode of realisation, the message (46) to be transmitted and its associated marking (M0) are serialised in a set of data (47) before transmission, as described above (see FIG. 2), then deserialised on reception by the card engine agent (CEA).

After reception of the message (46) and its associated marking (M0), and possibly deserialisation, by the card engine agent (CEA), this agent will first transmit this message (46) to the recipient card agent (CA), either directly or via a FIFO type output queue (55) which sends to this card agent (CA) the messages intended for it in the order that they were received, and secondly read the marking (M0) which accompanies this message and store its value as index (LRMN°C) of the last message received by the card.

At a given time, for example periodically or triggered by an event, the card engine agent (CEA) sends to the card engine proxy agent (CEPA) the value of the index of the last message received by the card (LRMN°C) as it was stored. When it receives this index of the last message received by the card (LRMN°C), the card engine proxy agent (CEPA) compares this index (LRMN°C), the last message stored index (M2) and the first message stored index (M1) corresponding to its acknowledgement of receipt buffer (54).

As described above, the card engine proxy agent (CEPA) then re-transmits to the card engine agent (CEA) the messages it has not yet received and also clears from its acknowledgement of receipt buffer (54) the messages stored there which have already been received.

In a variant of this mode of realisation, the method according to the invention includes an integrity check on the transmitted data using known means. Each message (46) received by the card engine agent (CEA) is only considered as received if the integrity of its content and possibly that of its marking (M0), is complete or meets specific conditions.

Similarly, this buffer flow control method, whose storage capacity may be very large or even variable depending on requirements can be used to receive and store messages intended for a card agent (CA) even if this agent is not accessible. In addition, the storage is carried out in the order that the messages would have been received if this card agent (CA) had been present in the network (1).

During normal operation a removable platform, for example a smartcard, which could be used in the method according to the invention, may frequently be disconnected from any link with any network, or be connected in different terminals. This is the case, for example, with a smartcard that the cardholder will use in various bank cash dispenser terminals as well as in the payment terminals of various shops or other sales outlets.

Depending on the applications, disconnection could occur in a manner which is unpredictable by the system, for example if the cardholder withdraws the card from the payment terminal without waiting for the end of the current operation.

In addition, it should be understood that the status of the removable platform as defined here may be disconnected since inaccessible for reasons other that the fact that it has been withdrawn from the terminal. Possible reasons include a failure or malfunction of the various communication means involved in its link to the network due to, for example, being outside the coverage area for this platform or for a terminal connected to the network by radio waves, congestion or failure of one of the intermediates used in this link, or a simple fault or failure of the terminal or the connection contacts of the card or terminal.

When a removable platform is disconnected, i.e. its status changes from connected to disconnected, the links are interrupted or disturbed sufficiently to become inoperative between the terminal and the removable platform, or possibly between the terminal and a data processing station connected with the removable platform. This data processing station could be for example a modular telephone that the smartcard is connected to, this telephone being linked, for example by radio waves, to a terminal connected to the network such as for example a radio base station.

In one mode of realisation, in case of disconnection, the terminal communicating with the removable platform becomes aware using known means that the platform is disconnected, and the terminal communication agent (TSPA, FIG. 3) sends a disconnection notification to the card engine proxy agent (CEPA) which manages the communications of at least one card engine agent (CEA), stored in this removable platform (30), with the network (1). This card engine proxy agent (CEPA) then stores, in storage means of the network (1), this disconnection notification or a data item (C0) representing it or representing the new accessibility status of this removable platform.

Once the removable platform has been declared inaccessible for the network, the card engine proxy agent (CEPA) corresponding to the card engine agent (CEA) of this removable platform interrupts its transmissions of messages to this removable platform. The card engine proxy agent (CEPA) then keeps as they are the messages to be sent to it still stored in its acknowledgement of receipt buffer (54), since it has not received an acknowledgement of receipt for these messages, as described above.

So that all disconnections are transparent for the network (1), at least as regards the coherence of the communications between the network and this removable platform, the corresponding card engine proxy agent (CEPA) continues to receive the messages intended for a card agent (CA) present in the removable platform (30) and stores them according to the buffer flow control method described above.

When the card can be accessed again by the terminal, the terminal becomes aware using known means of this connected status, and the terminal communication agent (TSPA, FIG. 3) sends a connection notification to the card engine proxy agent (CEPA) which manages the communications of at least one card engine agent (CEA), stored in this removable platform (30), with the network (1). This card engine proxy agent (CEPA) then stores, in storage means of the network (1), this connection notification or a data item (C0) representing it or representing the new accessibility status of this removable platform.

To maintain the transparency of communications between the network (1) and this removable platform (30), the card engine agent (CEA) of the removable platform and its card engine proxy agent (CEPA) present in the network (1) will then update their respective statuses, so that the communications between this platform and the network are restored without affecting the content or the causality order of their asynchronous message exchanges, whether by losing messages or by sending some messages more than once.

Figure 4:
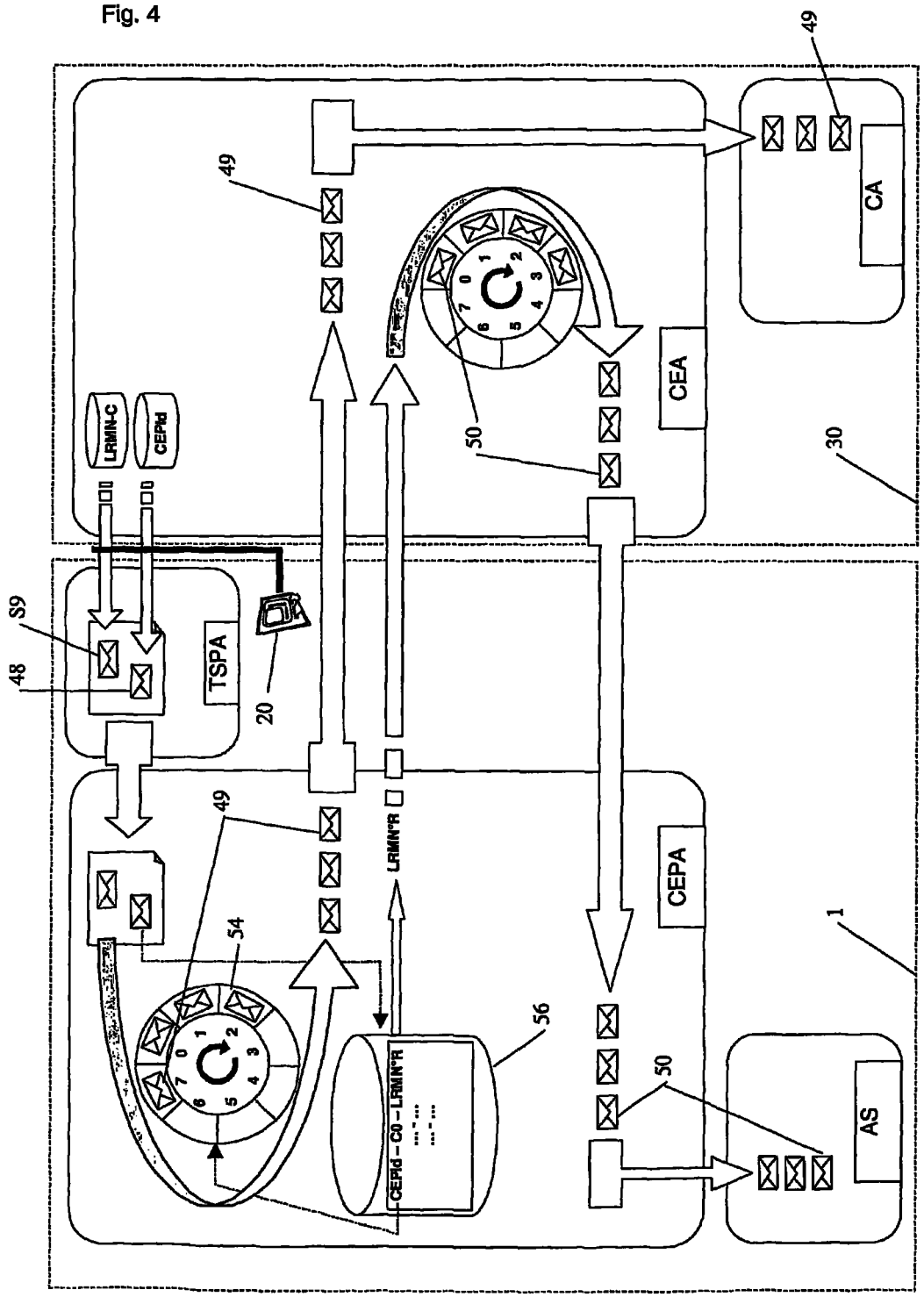
FIG. 4 represents a symbolic diagram describing how the message transmissions are updated by various agents when the removable platform is reconnected to the network after an interruption, in one mode of realisation of the method according to the invention.

In one mode of realisation of the method according to the invention represented in FIG. 4, when the status of the removable platform (30) changes from disconnected to connected, the terminal (20) becomes aware of this connection by known means (nor shown). This terminal communication agent (TSPA) then obtains, from a card engine agent (CEA) or from a card agent (CA) of the removable platform, an identification code (CEPId) identifying this card engine agent (CEA) or this card agent (CA), as well as the index of the last message received by the card (LRMN°C) stored by this card engine agent (CEA).

In a variant of the method according to the invention, the terminal communication agent (TSPA) managing the communications between this terminal and the removable platform is itself an AAA type agent and sends to the network for the card engine proxy agent (CEPA) corresponding to this card engine agent (CEA) an insertion notification as a message (48) including or representing the identification code (CEPId) of this card engine agent (CEA) accompanied by a marking (S9) including or representing the index of the last message received by the card (LRMN°C) stored by this agent (CEA) when it last received a message.

In one mode of realisation of the method according to the invention, not shown, the card engine proxy agent (CEPA) can manage the communications of the network (1) with one or more card engine agents (CEA) stored on one or more removable platforms. Such a card engine proxy agent (CEPA) then stores in storage means of the network (1), for each of the card engine agents to which it corresponds, the information it requires to manage the communications of this card engine agent with the network (1). This information may be, in particular, information representing the identification code (CEPId) of the card engine agent or of a card agent (CA), the accessibility status of the removable platform (C0), the index of the last message received by the network (LRMN°R) from this card engine agent, the first message stored index (S1, FIG. 2) and last message stored index (S3, FIG. 2), and the contents of the messages stored when they were sent to this card engine agent and for which it did not receive an acknowledgement of receipt.

When it receives the information representing the identification code (CEPId) of a card engine agent (CEA) corresponding to it located in a removable platform (30) which has just connected, the card engine proxy agent (CEPA) makes a comparison to identify this agent (CEA) and to read and possibly update the information (56, 54, C0) corresponding to the status of the communications of the network (1) with this card engine agent (CEA). It then sends to this card engine agent (CEA) the index of the last message received by the network (LRMN°R) corresponding to it.

When it receives information representing the index of the last message received by the card (LRMN°C), the card engine proxy agent (CEPA) clears from its acknowledgement of receipt buffer (54) the messages received correctly. Simultaneously, this card engine proxy agent (CEPA) transmits to this agent (CEA) the messages (49) still to be sent to it, in the order that they were received from their transmitting agent and according to the acknowledgement of receipt buffer method described above.

On reception of the index of the last message received by the network (LRMN°R) from its card engine proxy agent (CEPA), the card engine agent (CEA) clears from its acknowledgement of receipt buffer (52) the messages which have been correctly received and transmits to this agent (CEPA) the messages (50) still to be sent to it, in the order that they were received from their transmitting agent and according to the acknowledgement of receipt buffer method described above.

It is clear that with this update method, triggered after the removable platform (30) has been disconnected for a certain period, irrespective of how it was disconnected and irrespective of the terminal (20) to which it is reconnected or again accessible, the disconnection does not result in any corruption, loss or retransmission of messages between a card engine agent (CEA) stored in this removable platform (30) and its corresponding card engine proxy agent (CEPA) stored in the network (1).

Since this card engine proxy agent (CEPA) is stored in storage means of the network (1), and can therefore be accessed by this network irrespective of the accessibility status of the removable platform (30) it manages, it is clear that the method according to the invention guarantees communication between a card agent (CA) of this removable platform and any standard agent (AS) of the network (1) without corrupting the content or changing the causality order of the asynchronous messages exchanged between them.

This type of communication can therefore be carried out, possibly over long periods of time depending on the periods of connection of the removable platform, transparently between these agents (CA, AS), for as long as these agents, the network (1) and the various agents (CEA, CEPA, TSPA, CAPA) implementing the method according to the invention, exist.

In a variant of the method according to the invention, without leaving the scope of the invention, the messages received and transmitted by the removable platform are received and transmitted directly by the transmitting and respectively receiving card agent(s) (CA, CA°A, CA°B, CA°C), without transiting via a card engine agent (CEA, CEA°1, CEA°2).

In one mode of realisation (not shown), without leaving the scope of the invention, the card engine proxy agent and the terminal communication agent are combined into a single agent.

Since the method according to the invention can be used to set up a transparent link between an AAA type card agent located in a removable platform and any other AAA agent in an AAA-MOM type network, this card agent is seen by the network like any of its other AAA agents. With the method according to the invention, this type of removable platform therefore becomes a node integrated in the AAA network. It is clear therefore that this network may have a variable number of nodes including such a removable platform. In this description, a reference to any AAA agent in the network, known as standard agent (AS), may therefore apply to another AAA agent located on any removable platform using the method according to the invention, whether it is the same removable platform or another one.

It should be clear to those skilled in the art that other modes of realisation are possible with this invention, in numerous other specific forms, without leaving the scope of the invention as claimed. Consequently, these modes of realisation must be considered as examples, which may be modified in the field defined by the scope of the attached claims, and the invention must not be limited to the details given above.

The invention claimed is:

1. A computer communication method by asynchronous messages between firstly at least any one software agent, known as card agent, stored in a portable data processing station, known as removable platform, and which can be connected or disconnected from communication means of at least one data processing station, known as terminal, at any time and independently of the operating status of the terminal or of the removable platform, and secondly at least any one software agent, known as standard agent, wherein the standard agent is stored in storage means of a computer network to which the terminal is connected and wherein the network includes one or more data processing stations storing one or more software agents communicating together via a distributed software infrastructure for computer communication by asynchronous messages, wherein the method comprises a step to:
store a message sent by the card agent to at least one standard agent or sent by a standard agent to the card agent in storage means of the network by at least one intermediate agent managing the communications of this card agent with the network.

2. The method according to claim 1, wherein the method further comprises the following steps:
transmission to the network by this card agent of the message or message indicator intended for a standard agent;
transmission of the message or message indicator intended for this standard agent from this card agent to an agent known as card engine proxy agent stored in storage means of the network;
storage of said message or message indicator in storage means of the network by the card engine proxy agent;
transmission via the network of said message or message indicator by the card engine proxy agent.

3. The method according to claim 1, wherein the method further comprises the following steps:
reception via the network of the message or message indicator intended for this card agent by an agent known as card engine proxy agent stored in storage means of the network;
storage of said message or message indicator in storage means of the network by the card engine proxy agent;
transmission of said message or message indicator by the card engine proxy agent to at least one card agent stored in the removable platform;
storage of said message or message indicator in storage means of the removable platform.

4. The method according to claim 2, wherein the messages transmitted between the card agent and the card engine proxy agent or vice versa, transit via a card engine agent stored in storage means of the removable platform, designed to manage or control this card agent.

5. The method according to claim 1 wherein the method further comprises the following steps:
storage of said message or message indicator in storage means of the network by a card agent proxy agent stored in the network and indicating the identity of the recipient card agent;
transmission of a message or message indicator intended for the card agent from the card agent proxy agent to a card engine proxy agent corresponding to the recipient card agent.

6. The method according to claim 5 wherein the message exchanges between the card engine proxy agent and the card engine agent are carried out according to a "first in first out" type scheduling system.

7. The method according claim 5, wherein the message exchanges between the card engine proxy agent and the card engine agent use at least one transmission method with acknowledgement of receipt so that the sender of the message or message indicator can obtain confirmation, by the recipient of this message, of its correct reception and so that the messages not received by the recipient can be transmitted again.

8. The method according to claim 4, wherein the card engine agent or the card engine proxy agent sends one or more messages or message indicators to a given recipient agent implementing a method known as acknowledgement of receipt buffer method, comprising the following steps:
storage in an acknowledgement of receipt buffer, by the sender of one or more messages or message indicators to be sent, these messages or indicators being sorted in the order in which they must be sent and associated with "index" identifiers ;
transmission, from the sender to the recipient, of at least one message or message indicator together with "marking" data representing the index of this message.

9. The method according to claim 8, wherein said acknowledgement of receipt buffer method further comprises the following steps:
- reception by the recipient, of at least one message or message indicator together with "marking" data representing the index of this message;
- transmission from the recipient to the sender of data known as index of the last message received by the recipient including or representing the value of the index represented by the marking which accompanied the last message or indicator received from this sender;
- reception of this last message received index by the sender and comparison of this index with the indices of the messages or indicators stored in its acknowledgement of receipt buffer;
- further transmission, by the sender to the recipient, of messages or indicators stored after the message whose index corresponds to the index of the last message received by the recipient in its acknowledgement of receipt buffer.

10. The method according to claim 8, wherein a further transmission, by said acknowledgement of receipt buffer method, of messages stored by the sender in its acknowledgement of receipt buffer and not yet received by the recipient, is carried out in the order that these messages were stored in this acknowledgement of receipt buffer.

11. The method according to claim 8, wherein said acknowledgement of receipt buffer method further comprises a step:
- in which the recipient stores, as index of the last message received by the network or index of the last message received by the card, data including or representing the index of the location where this message is stored in the sender's acknowledgement of receipt buffer.

12. The method according to claim 8, wherein the acknowledgement of receipt buffer method further comprises at least one step in which the recipient of the message or indicator checks the integrity of the content of this message or indicator, the index of the last message received by the recipient then being determined as being the index represented by the marking accompanying the last message received whose integrity meets specific conditions.

13. The method according to claim 1, wherein the card engine proxy agent sends to the card engine agent one or more messages or indicators received from the network implementing a method known as buffer flow control method, comprising the following steps:
- storage in a flow control buffer located in storage means of the network of one or more messages or indicators received, these messages or indicators being sorted according to their order of reception;
- verification of the operation of the acknowledgement of receipt buffer;
- transmission of said messages or indicators, in the order that they were received, according to said acknowledgement of receipt buffer method.

14. The method according to claim 2, wherein the communication means of the terminal are managed by at least one terminal communication agent stored in storage means of the terminal or of the network transition of the removable platform status from connected to disconnected triggering the following steps:
- detection by the terminal communication agent of disconnection of the removable platform;
- transmission of a disconnection notification message from the terminal communication agent to the card engine proxy agent;
- storage in the storage means of the network by the card engine proxy agent of the removable platform disconnected status.

15. The method according to claim 13, wherein said buffer flow control method also includes a step in which the card engine proxy agent obtains the connection or accessibility status of the removable platform from the network.

16. The method according to claim 4, wherein communication of the terminal with the removable platform is managed by at least one terminal communication agent stored in storage means of the terminal or of the network transition of this removable platform status from disconnected to connected, combined or not with another event, triggering the following steps:
- detection of this connection by the terminal communication agent;
- obtention by the terminal communication agent of data representing a code identifying the card agent or the card engine agent stored in the storage means of the removable platform;
- transmission of an insertion notification message, from the terminal communication agent to the card engine proxy agent including or representing the code of the card engine agent or of the card agent.

17. The method according claim 8, wherein the card engine proxy agent stored in the network and the card engine agent stored in the removable platform exchange one or more messages or message indicators according to said acknowledgement of receipt buffer method, transition of the removable platform status from disconnected to connected, combined or not with another event, triggering an update method including the following steps:
- transmission, from the terminal communication agent or the card engine agent to the card engine proxy agent of the index of the last message received by the card stored by this card engine agent;
- transmission, from the card engine proxy agent to the card engine agent of messages or indicators stored in the acknowledgement of receipt buffer as being intended for this card engine agent and not yet received by this card engine agent.

18. The method according to claim 8, wherein the card engine proxy agent stored in the network and the card engine agent stored in the removable platform exchange one or more messages or message indicators according to said acknowledgement of receipt buffer method, transition of the removable platform status from disconnected to connected, combined or not with another event, triggering an update method including the following steps:
- transmission, from the card engine proxy agent to the card engine agent of the transmission index of the last message received by the network stored by this card engine proxy agent;
- transmission, from the card engine agent to the card engine proxy agent of messages or indicators stored in the acknowledgement of receipt buffer as being intended for this card engine proxy agent, and not yet received by this card engine proxy agent.

19. The method according to claim 1, wherein the method further comprises:
- a serialisation step comprising a conversion of software objects to be sent by agent from a communication terminal to the removable platform or vice versa, this conversion being carried out from the structured form of these software objects in the agent which wants to send them, to the less structured data form in which they can be sent between a communication terminal and the communication means of the removable platform or vice versa;

a deserialisation step performing the reverse conversion once this transmission has been carried out.

20. The method according to claim 4, wherein at least one card engine proxy agent manages the communications with the network of several card engine agents this card engine proxy agent storing, in the network data representing an identification code, a platform accessibility or inaccessibility status, an index of the last message received by the network, and the content of the messages sent without acknowledgement of receipt, for each of the card engine agents that the at least one card engine proxy agent manages.

21. The method according to claim 1, wherein at least one agent communicates via the network using an AAA (Agent Anytime Anywhere) or compatible software communication infrastructure.

22. The method according to claim 1, wherein at least one of said agents participates in at least one application programmed in language Java®.

23. A communication system by asynchronous messages between firstly a computer network comprising one or more data processing stations storing one or more software agents communicating together via a distributed software infrastructure for computer communication by asynchronous messages, and secondly at least one portable object comprising:

at least one processor;

storage means; and means of communication with at least one terminal connected to the network wherein this portable object comprises:

at least one software agent, known as card agent, communicating by message or message indicator with at least any one software agent, known as standard agent, this standard agent being either stored in storage means of the computer network or stored in this removable platform or in another similar platform, the computer network this communication being carried out via at least one intermediate agent stored in the storage means of the network and managing the communications of the card agent with the network.

24. The system according to claim 23, wherein the system comprises at least one software agent, known as terminal communication agent stored in the storage means of the terminal or of the network designed to manage the communication between the terminal and the removable platform, this terminal communication agent and to send the connection or disconnection notifications of the removable platform.

25. The system according to claim 23, wherein the removable platform comprises at least one software agent, known as card engine agent designed to manage or control the operation of at least one card agent, the card engine proxy agent then managing the communications of this card engine agent with the network.

26. The system according to claim 25, wherein the system further comprises at least one software agent, known as card agent proxy agent stored in the storage means of the network designed to indicate the identity of at least one card agent and receive from the network the messages addressed to the card agent.

27. The system according to claim 26, wherein the network or the removable platform, or both, comprise a memory structure, known as acknowledgement of receipt buffer designed to index and store the messages sent from the network to the removable platform or vice versa, and send them again to their recipients when they were not correctly received.

28. The system according to claim 27, wherein the network comprises a memory structure, known as flow control buffer designed to store the messages received by the card engine proxy agent for a card agent then to present these messages to the acknowledgement of receipt buffer for transmission to the removable platform when the removable platform is accessible or when the acknowledgement of receipt buffer is not full.

29. The system according to claim 27, wherein the acknowledgement of receipt buffer and the flow control buffer extract the messages they store in the order that they were stored.

30. The system according to claim 25, wherein the card engine proxy agent and the card engine agent include a serialisation function and a deserialisation function, carrying out in one direction and respectively in the opposite direction, the conversion or translation of at least one message to be sent via the terminal between the structure they present when they are received and a structure compatible with the terminal and the communication means of the removable platform.

31. The system according to claim 23, wherein the communication between the terminal and the communication means of the removable platform is carried out by transmitting data in APDU (Application Data Protocol Unit) format according to standard ISO 7816.

32. The system according to claim 23, wherein at least two stations forming the network communicate together according to an AAA-MOM (Agent Anytime Anywhere - Message Oriented Middleware) type software infrastructure.

33. The system according to claim 23, wherein the system further comprises at least one of said agents programmed in language Java®.

\* \* \* \* \*